(No Model.)
C. A. FAIRAND.
PRICE INDICATING WEIGHING SCALE.
No. 442,873. Patented Dec. 16, 1890.
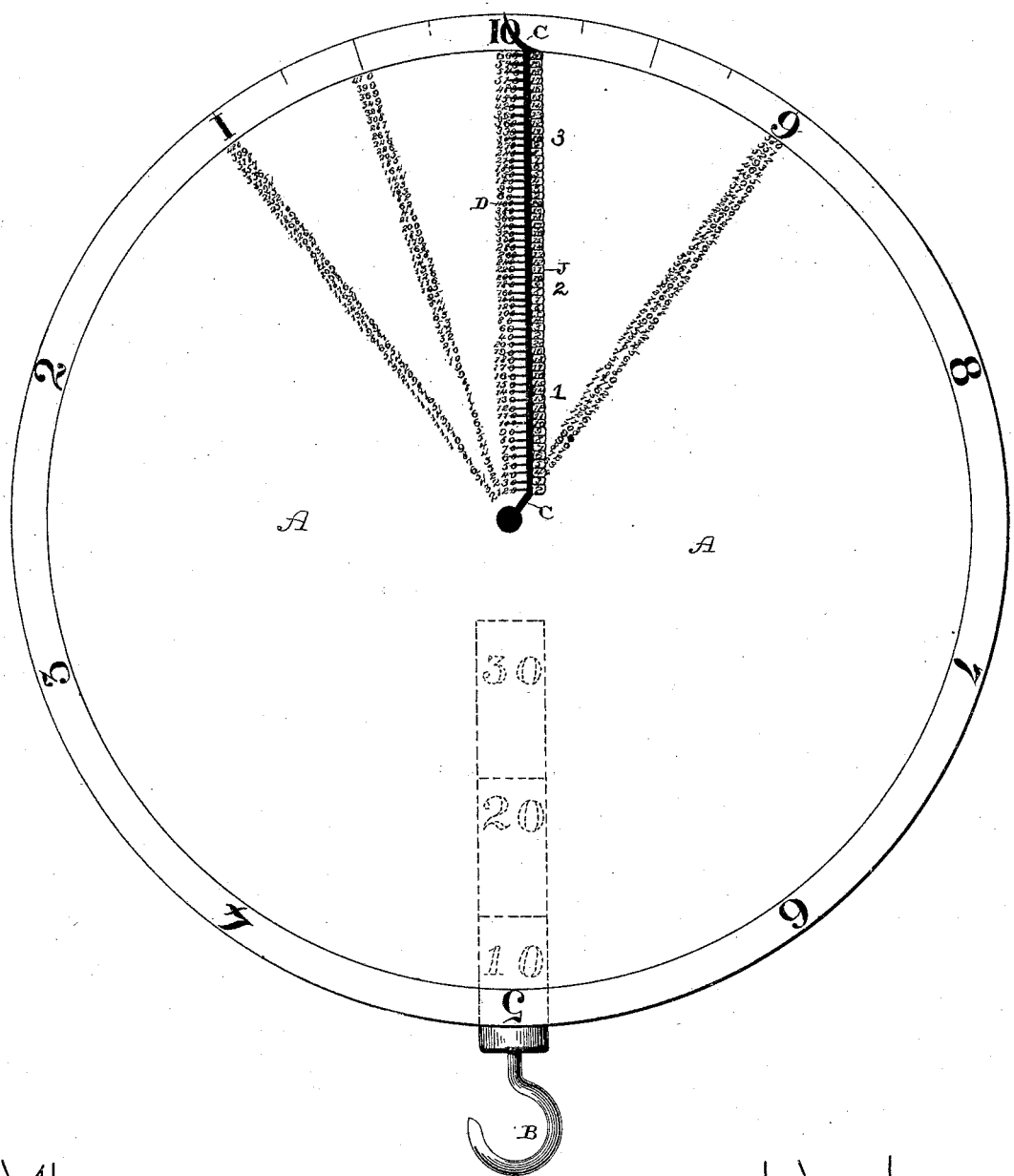
Witnesses:
E. P. Ellis,
L. L. Burket.
Inventor:
Chas. A. Fairand,
per
J. A. Lehmann,
Atty
THE NORRIS PETERS CO., PHOTO-LITHO., WASHINGTON, D. C.

UNITED STATES PATENT OFFICE.

CHARLES ALEXANDER FAIRAND, OF WATERTOWN, NEW YORK.

PRICE-INDICATING WEIGHING-SCALE.

SPECIFICATION forming part of Letters Patent No. 442,873, dated December 16, 1890.

Application filed July 16, 1889. Renewed October 17, 1890. Serial No. 368,389. (No model.)

*To all whom it may concern:*

Be it known that I, CHARLES A. FAIRAND, of Watertown, in the county of Jefferson and State of New York, have invented certain new and useful Improvements in Pointers and Disks for Spring-Scales; and I do hereby declare the following to be a full, clear, and exact description of the invention, such as will enable others skilled in the art to which it pertains to make and use it, reference being had to the accompanying drawing, which forms part of this specification.

My invention relates to an improvement in pointers and disks for price spring-scales; and it consists in the combination and arrangement of parts hereinafter described, and pointed out in the claim.

The object of my invention is to provide a pointer and disk which is applicable to any spring-scales, and by means of which the aggregate cost of the article being weighed at varying prices per pound is instantly indicated.

The accompanying drawing represents a side elevation of a disk and pointer which embodies my invention.

A represents a disk which is adapted to be placed over the face of any ordinary spring-scale, and which is divided into pounds, half-pounds, and quarter-pounds, as shown, the full number of pounds indicated being ten. Opposite each figure indicating the pounds and radiated from near the center of the disk is a column of figures which indicate the aggregate cost at varying prices per pound of that number of pounds of the material being weighed. Radial columns of figures indicating the aggregate cost of the material being weighed may also be placed opposite the half and quarter pounds, if so desired.

Upon the cylinder containing the spring and to which the hook B is secured are indicated ten, twenty, and thirty pounds, as shown. The pointer C does not extend in a straight line from the center of the disk to its outer end, but is bent at a suitable angle near its inner end, as shown, and then its outer end is given a corresponding bend in the opposite direction, so as to point to the number of pounds, which are in a direct line with the center of the disk. Upon one edge of this pointer are formed a number of small points or projections D, and upon the opposite edge of the pointer are formed a corresponding number of figures J, which indicate the price per pound of the article being weighed. If there are sixty of the points D, there will be sixty figures upon the opposite edge, and these figures will be divided into groups of twenty, as shown. I here show the pointer provided with three groups 1, 2, and 3 of price figures; but as many groups can be placed upon the pointer as necessity may require to suit large or small scales. The figures marked upon the disk A just opposite the points will indicate the aggregate cost of so many pounds at a certain price per pound.

As the scale-pan weighs down, the pointer shows the number of pounds weighed, and the point opposite the amount per pound shows the total cost. For instance, when the pointer is at 1, being one pound, the amount at twenty cents per pound shows "20" in the first radial group of figures, which indicate the aggregate cost of the article being weighed. Again, the pointer being rotated to 9, the amount at twenty shows "180." As soon as the pan has weighed ten pounds the cylinder containing the spring has descended so far that it shows "10" below the lower margin of the disk. It then goes on to weigh from ten to twenty pounds at from two to twenty cents per pound, which is shown on the pointer in the second group of figures. For instance, when the pointer gets to 1 on the second journey around, it means eleven pounds, and at twenty cents per pound the small point opposite 20 of group 2 on the pointer points to "220" in the first radial group of figures upon the disk A, which is the aggregate cost of an article weighing eleven pounds at twenty cents per pound. When the pointer comes around to 10 the second time, twenty pounds have been weighed and the pan has brought the cylinder down until it shows "20" below the lower margin of the disk. As the weight increases from twenty to thirty pounds the prices are read off in the third group of figures in the same manner as before, and when the pointer comes around to 10 for the third time the cylinder indicates "30."

The disks, having the number stamped, printed, or marked thereon in any suitable manner, and the pointer are intended to be applied to any spring-scales now in use. The object of providing the cylinder with figures, as described, is to indicate to the operator in which group of figures upon the pointer to look for the price per pound, and then its corresponding point or projection will point to the aggregate cost of the article upon the disk A. Were this not provided the operator could not tell whether or not the article upon the pan weighed eleven, twenty-one, or thirty-one pounds, and hence would not know in which group of figures upon the pointer to look for ascertaining the aggregate cost of the article upon the disk A. By this construction, however, the operator is informed at a glance upon what part of the disk A to look for the cost of the article.

Having thus described my invention, I claim—

The combination, with a spring-scale having its cylinder provided with figures which indicate the number of revolutions given the pointer, of a disk having figures indicating the aggregate cost of the article, and a pointer provided with groups of figures corresponding to the figures upon the cylinder, for the purpose described.

In testimony whereof I affix my signature in presence of two witnesses.

CHARLES ALEXANDER FAIRAND.

Witnesses:
 JOHN N. CARLISLE,
 L. H. AINSWORTH.